United States Patent
Silvis

(10) Patent No.: US 7,490,463 B2
(45) Date of Patent: Feb. 17, 2009

(54) PROCESS AND SYSTEM FOR REMOVING SOOT FROM PARTICULATE FILTERS OF VEHICLE EXHAUST SYSTEMS

(75) Inventor: Thomas W. Silvis, Flushing, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/478,469

(22) Filed: Jun. 29, 2006

(65) Prior Publication Data

US 2008/0000221 A1   Jan. 3, 2008

(51) Int. Cl.
*F01N 3/00* (2006.01)

(52) U.S. Cl. .............. 60/286; 60/276; 60/295; 60/297; 60/301; 60/303; 60/311

(58) Field of Classification Search .......... 60/276, 60/286, 295, 297, 301, 303, 311
See application file for complete search history.

(56) References Cited

U.S. PATENT DOCUMENTS

| | | | |
|---|---|---|---|
| 6,655,130 B1 | 12/2003 | Kirwan et al. | |
| 6,742,328 B2 | 6/2004 | Webb et al. | |
| 6,813,882 B2 | 11/2004 | Hepburn et al. | |
| 6,832,473 B2 | 12/2004 | Kupe et al. | |
| 6,915,629 B2 * | 7/2005 | Szymkowicz | 60/286 |
| 7,036,489 B1 * | 5/2006 | Wu et al. | 123/519 |
| 7,093,428 B2 * | 8/2006 | LaBarge et al. | 60/286 |
| 7,131,264 B2 * | 11/2006 | Weissman et al. | 60/286 |
| 7,191,590 B2 * | 3/2007 | Nagaoka et al. | 60/285 |
| 7,210,288 B2 * | 5/2007 | Bandl-Konrad et al. | 60/297 |
| 2003/0163988 A1 * | 9/2003 | Kirwan et al. | 60/289 |
| 2004/0146458 A1 | 7/2004 | Weissman et al. | |
| 2005/0022450 A1 | 2/2005 | Tan et al. | |
| 2005/0056236 A1 | 3/2005 | Allston et al. | |
| 2005/0103001 A1 | 5/2005 | Kupe et al. | |

* cited by examiner

*Primary Examiner*—Thomas E Denion
*Assistant Examiner*—Diem Tran
(74) *Attorney, Agent, or Firm*—Paul L. Marshall

(57) ABSTRACT

A motor vehicle exhaust aftertreatment system includes an exhaust conduit that includes a $NO_x$ adsorber, a particulate filter, a reformer for generating reformate containing hydrogen and carbon monoxide from a fuel source, a reformate conduit, and an oxygen sensor. In response to a pressure drop through the particulate filter attaining a threshold value, reformate is introduced under selected controlled flow conditions into the exhaust conduit and caused to undergo combustion. The resulting exotherm maintains the temperature within the particulate filter within a selected range that is effective to cause oxidation and removal of soot from the particulate filter. Introduction of reformate into the exhaust conduit is discontinued when the pressure drop through the particulate filter is decreased to a selected value.

18 Claims, 4 Drawing Sheets

PROCESS AND SYSTEM FOR REMOVING SOOT FROM PARTICULATE FILTERS OF VEHICLE EXHAUST SYSTEMS

TECHNICAL FIELD

The present invention relates to the aftertreatment of motor vehicle exhaust and, more particularly, to a process and system for removing soot from particulate filters of vehicle exhaust aftertreatment systems.

BACKGROUND OF THE INVENTION

Internal combustion engines, including diesel engines, operate by the controlled combustion of hydrocarbon fuels and produce exhaust gases containing complete combustion products such as carbon dioxide ($CO_2$) and water ($H_2O$), and incomplete combustion products such as carbon monoxide (CO) and unburned hydrocarbons (HC). Further, the very high temperatures produced by the burning of the hydrocarbon fuels with air results in the detrimental formation of nitrogen oxide compounds ($NO_x$). Certain undesirable components of the exhaust, including CO, HC, $NO_x$, and soot particulates must be controlled to meet government emissions regulations.

Diesel engines are characterized by higher thermal efficiency than gasoline engines because of their high compression ratios, but they typically generate higher levels of $NO_x$ and particulate emissions than gasoline engines. To reduce these emissions to required low levels, premixed diesel combustion technology is being developed that provides for the fuel-air charge to be well mixed and diluted, thereby enabling combustion to occur at low temperatures without local rich zones. One approach to premixed combustion is to reduce engine compression ratio, increase charge dilution with exhaust gas, and inject fuel incrementally into the cylinder during the compression stroke. Generally, this lengthens the ignition delay period to provide more time for fuel-air mixing. This approach works best at medium engine loads but not very well at high loads or very low loads. Engine load refers to relative torque, i.e., the ratio of actual torque to maximum torque at a given engine speed. Medium loads may be defined as lying between about one-third and about two-thirds of maximum torque. Accordingly, low loads are below about one-third maximum torque, and high loads are above about two-thirds maximum torque.

For high loads, detonation of the fuel-air mixture may produce high combustion rates and noise. For very low loads, the mixture is very lean and ignition may become unstable, with increased occurrence of misfire cycles. The main technical challenges are control of combustion initiation, timing and rate to achieve effective premixed combustion over an extended range of engine load. Another goal is to improve emission aftertreatment performance without compromising overall engine efficiency under operating conditions for which premixed combustion cannot be achieved.

The quantities of pollutants generated by incomplete combustion varies with operating conditions of the engine but are influenced predominantly by the air-to-fuel ratio in the combustion cylinder. Conditions conducive to reducing carbon monoxide and unburned hydrocarbons, i.e., a fuel mixture just lean of stoichiometric and high combustion temperatures, cause an increased formation of $NO_x$, and conditions conducive to reducing the formation of $NO_x$, i.e., rich fuel mixture and low combustion temperatures, cause an increase in carbon monoxide and unburned hydrocarbons in the exhaust gases. As a result, significant amounts of CO, HC and $NO_x$ are emitted within the region of stable operation of an internal combustion engine.

One approach for treating nitrogen oxides in exhaust gases is to incorporate a $NO_x$ adsorber, also referred to as a "lean-$NO_x$ trap," in the exhaust lines. The $NO_x$ adsorber promotes the catalytic oxidation of nitrogen oxides by catalytic metal components effective for such oxidation, such as precious metals. The formation of $NO_2$ is generally followed by the formation of a nitrate when the $NO_2$ is adsorbed onto the catalyst surface. The $NO_2$ is thus "trapped", i.e., stored, on the catalyst surface in the nitrate form. The system can be periodically operated under fuel-rich combustion to regenerate the $NO_x$ adsorber. During this period of fuel-rich combustion, the absence of oxygen and the presence of a reducing agent promote the release and subsequent reduction of the stored nitrogen oxides. However, this period of fuel-rich combustion may also result in a significant fuel penalty.

As already noted, exhaust gas streams can further comprise particulate matter such as carbon-containing particles or soot. A particulate filter is commonly used with a compression-ignition engine to prevent the carbon particles or the soot from exiting a tailpipe. The particulate filter may be a stand-alone device separate and distinct from devices employing catalytic elements for removing undesirable $NO_x$ gaseous components. Carbon particles can be trapped in the particulate filter and then periodically burned to regenerate the filter.

Reformates are hydrogen-enriched fuels that can be produced from a variety of sources, including gasoline, diesel, and other liquid or gaseous fuels. On-board reformers for producing hydrogen-enriched reformate fuels are described in, for example, U.S. Pat. Nos. 6,655,130 and 6,832,473 and U.S. Patent Application Publication Nos. 2004/0146458 and 2005/0022450, the disclosures of which are incorporated herein by reference.

Combustion of a hydrogen-enriched reformate fuel produced by an on-board reformer can be employed to burn accumulated soot from a particulate filter, but the combustion needs to be carefully controlled to prevent overheating and consequent damage to the filter, in particular, the porous filter support. Controlling the soot-burning exotherm would, for example, permit the use of cordierite as a support material in place of the more expensive silicon carbide.

The motor vehicle exhaust system and process for removing soot from a particulate filter in accordance with the present invention provides for the controlled combustion of reformate with oxygen in the exhaust conduit, resulting in the effective removal of soot from a particulate filter, without attendant damage to the filter.

SUMMARY OF THE INVENTION

The present invention is directed to a motor vehicle exhaust aftertreatment system that comprises: an exhaust conduit for conveying exhaust fluid from an engine comprising a $NO_x$ adsorber that includes a $NO_x$ adsorber inlet and outlet, and further comprising a particulate filter that includes a particulate filter inlet and outlet; a reformer for generating reformate containing hydrogen and carbon monoxide from fuel supplied from a fuel source; a reformate conduit for conveying reformate from the reformer into the exhaust conduit upstream of the particulate filter; an oxygen sensor disposed in the exhaust conduit downstream of the reformate conduit and upstream of the particulate filter for determining the oxygen concentration of fluid in the exhaust conduit, the oxygen concentration being maintained within a selected concentration range; a pressure sensor disposed at each of the particulate filter inlet and outlet for determining pressure drop through the particulate filter; and a temperature sensor disposed at each of the particulate filter inlet and outlet.

In response to a pressure drop through the particulate filter attaining a threshold value, as determined by the pressure sensors disposed at the particulate filter inlet and outlet, reformate is introduced under selected controlled flow conditions from the reformer through the reformate conduit into the exhaust conduit and caused to undergo combustion, resulting in an exotherm. The selected controlled flow and subsequent combustion of the reformate in the exhaust conduit is carried out under conditions effective to maintain the temperature within the particulate filter within a selected temperature range, as measured by the temperature sensors respectively disposed at the inlet and outlet.

The exotherm resulting from combustion of the reformate heats fluid passing through the particulate filter to a temperature effective to oxidize and thereby remove soot from the particulate filter. Introduction of reformate into the exhaust conduit is discontinued when the pressure drop through the particulate filter is decreased to a selected value.

The present invention is further directed to a process for removing soot from a particulate filter using the motor vehicle exhaust aftertreatment system just described.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
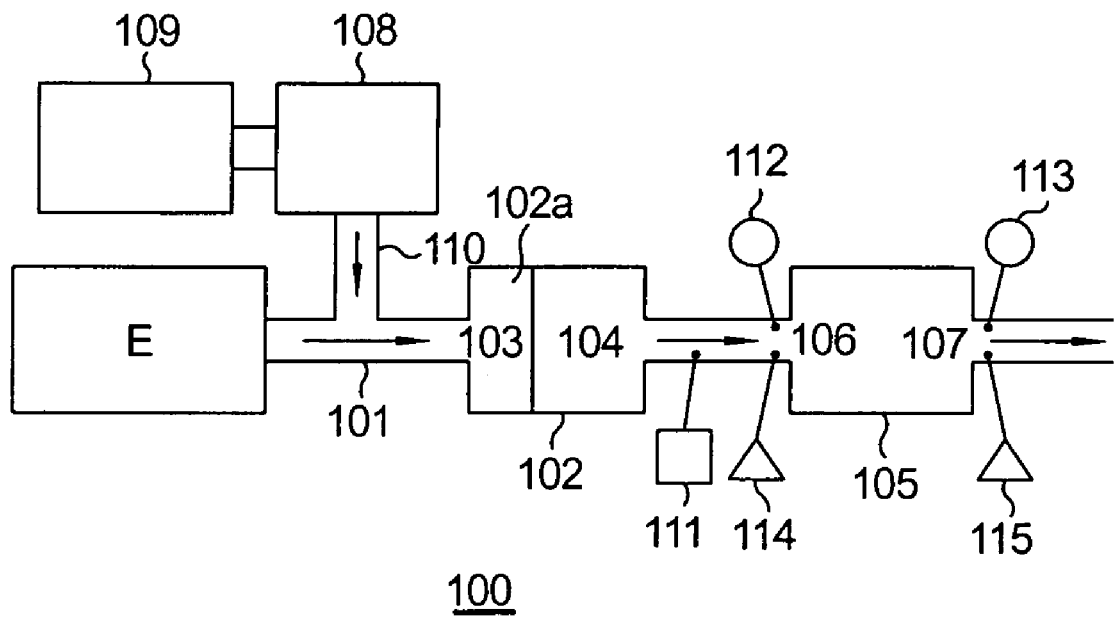
FIGS. 1 and 2 are schematic representations of two embodiments of a motor vehicle exhaust aftertreatment system in accordance with the present invention. The arrows in FIGS. 1 and 2 indicate the direction of gas flow in the depicted embodiments.

FIG. 1 schematically depicts a motor vehicle exhaust aftertreatment system 100 in accordance with the present invention. An exhaust conduit 101 that conveys exhaust fluid from a diesel engine E includes a $NO_x$ adsorber 102 having an inlet 103 and an outlet 104 and a particulate filter 105 having an inlet 106 and an outlet 107. $NO_x$ adsorber 102 further includes an oxidation catalyst 102a.

System 100 also includes a reformer 108 that generates a hydrogen-containing reformate fuel from a fuel source 109. The reformate is introduced, preferably by intermittent pulsed flow, into exhaust conduit 101 via reformate conduit 110. An oxygen sensor 111, which is disposed in exhaust conduit 101 downstream of reformate conduit 110 and upstream of particulate filter 105, measures the concentration of oxygen in the fluid flowing through exhaust conduit 101. To ensure efficient soot removal from particulate filter 105, an oxygen concentration of at least about 10 vol. %, preferably about 11 vol. % to about 19. vol. %, is desired.

Pressure sensors 112 and 113, disposed at, respectively, particulate filter inlet 106 and outlet 107, enable the measurement of pressure drop through particulate filter 105. In response to a pressure drop through particulate filter 105 attaining a threshold value, as determined by pressure sensors 112 and 113, an exotherm is generated in exhaust conduit 101 by combustion of reformate promoted by catalyst 102a of $NO_x$ adsorber 102. Introduction of reformate into exhaust conduit 101 is discontinued when the pressure drop through particulate filter 105 is decreased to a selected value.

Temperature sensors 114 and 115, disposed at, respectively, inlet 106 and outlet 107 of particulate filter 105, enable the temperature range within particulate filter 105 to be measured and controlled. For effective soot removal, a selected temperature range within particulate filter 105 of about 600° C. to about 750° C. is preferred.

Figure 2:
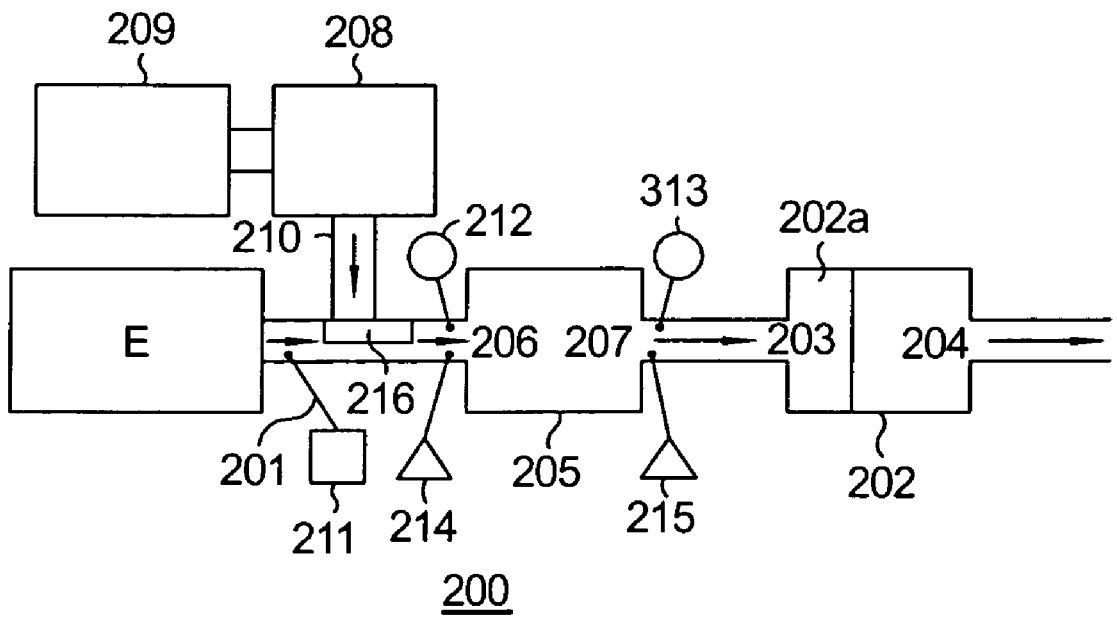

FIG. 2 schematically depicts a second embodiment 200 of the motor vehicle exhaust aftertreatment system of the present invention. An exhaust conduit 201 that conveys exhaust fluid from a diesel engine E includes a $NO_x$ adsorber 202 having an inlet 203 and an outlet 204 and a particulate filter 205 having an inlet 206 and an outlet 207. $NO_x$ adsorber 202 further includes an oxidation catalyst 202a.

System 200 also includes a reformer 208 that generates a hydrogen-containing reformate fuel from a fuel source 209. The reformate is conveyed to exhaust conduit 201 via reformate conduit 210. An oxygen sensor 211, which is disposed in exhaust conduit 201 between engine E and a burner 216, measures the concentration of oxygen in the fluid flowing through exhaust conduit 201.

Pressure sensors 212 and 213, disposed at, respectively, particulate filter inlet 206 and outlet 207, enable the measurement of pressure drop through particulate filter 205. Temperature sensors 214 and 215, similarly disposed at, respectively, inlet 206 and outlet 207, enable the temperature range within particulate filter 205 to be measured and controlled.

In response to a pressure drop through particulate filter 205 attaining a threshold value, as determined by pressure sensors 212 and 213, an exotherm is generated in exhaust conduit 201 by combustion of reformate effected by burner 216. Introduction of reformate into exhaust conduit 201 through burner 216, which preferably is a tube burner that includes a glow plug (not shown), is discontinued when the pressure drop through particulate filter 205 is decreased to a selected value.

The accumulation of soot in the particulate filter of an exhaust aftertreatment system results in a pressure drop through the filter. In accordance with the present invention, reformate is introduced in a controlled flow into the exhaust conduit and caused to undergo combustion, resulting in an exotherm. Through this selected controlled reformate flow and subsequent combustion, the temperature within the particulate filter is maintained within a selected temperature range that enables the oxidation and removal of soot without attendant damage to the particulate filter. Introduction of reformate into the exhaust conduit is discontinued when the pressure drop through the particulate filter is decreased to a selected value.

Figure 3A:
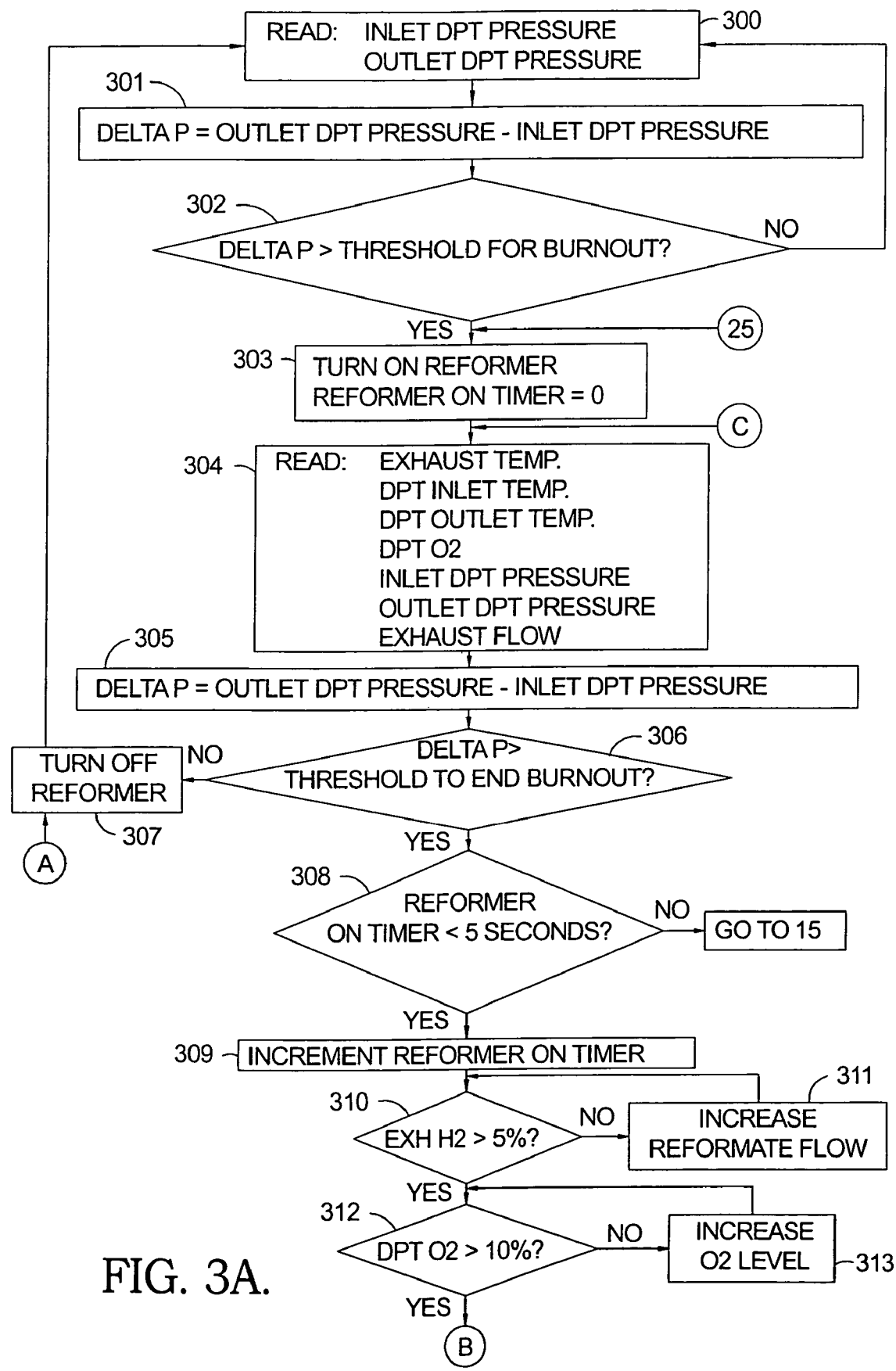
FIGS. 3A, 3B, 3C constitute a flow chart schematically depicting the soot removal process of the present invention.
Figure 3B:
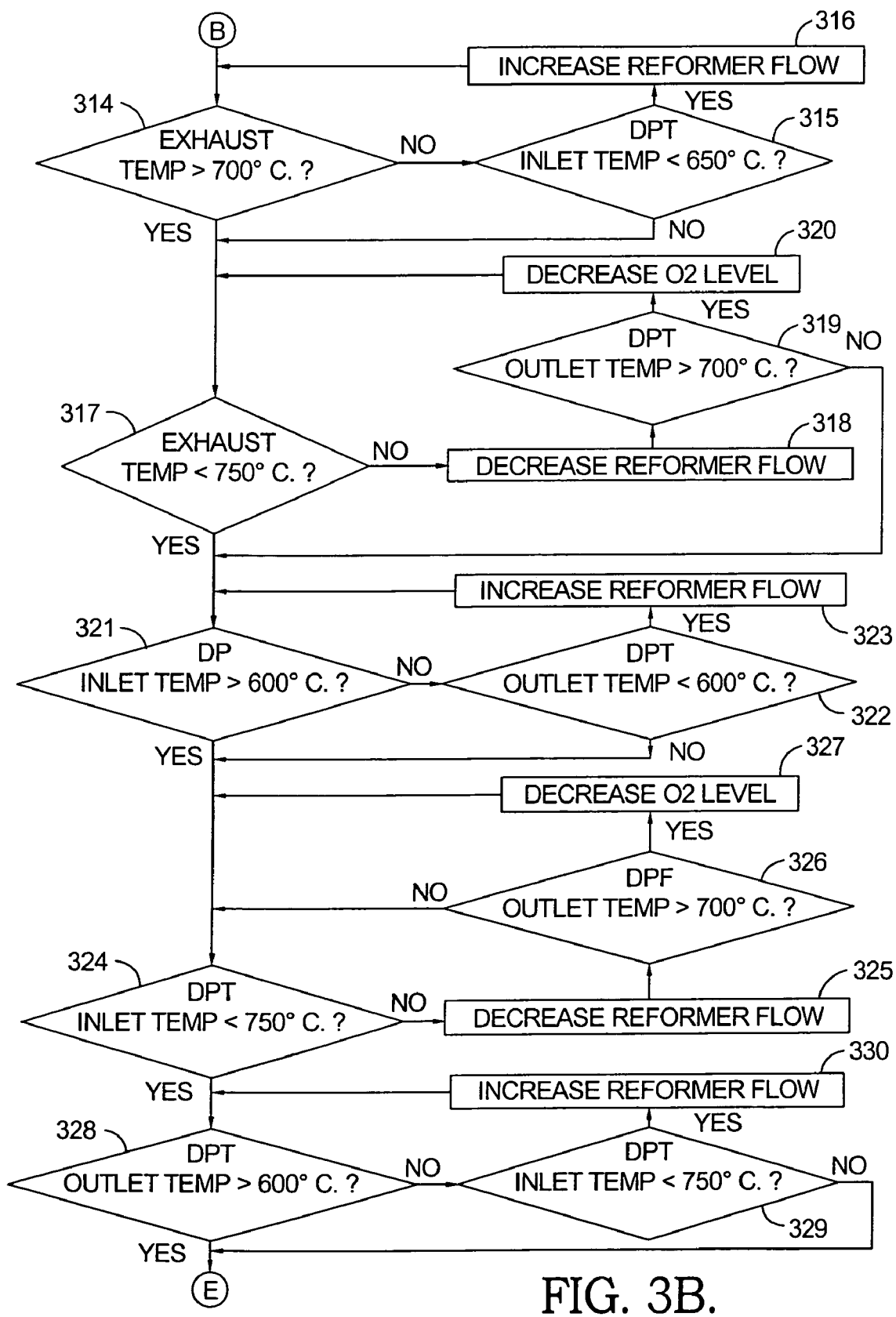
Figure 3C:
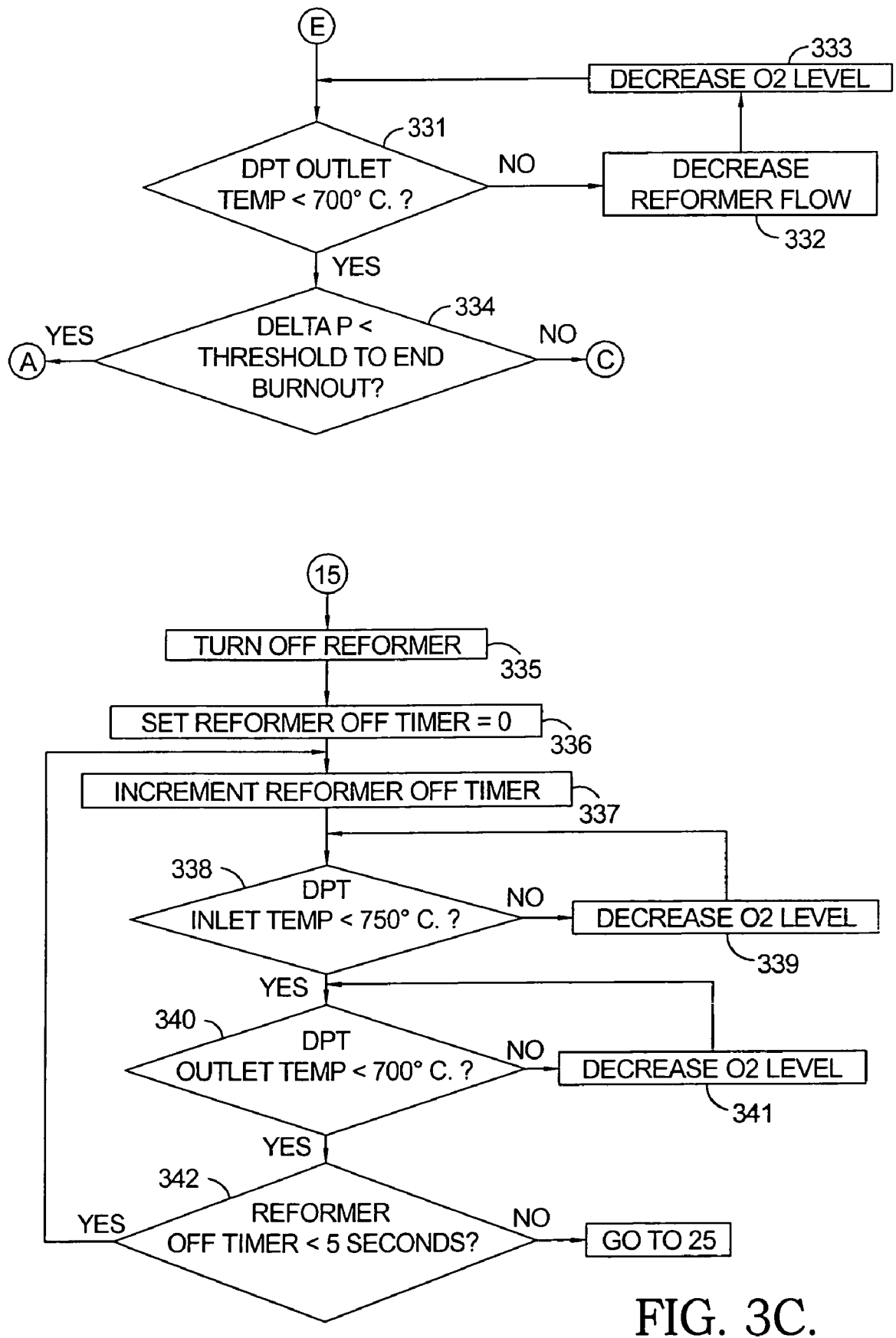

The soot removal process of the present invention thus constitutes a feedback loop that is further described by the flow chart depicted in FIGS. 3A, 3B, 3C. Referring first to FIG. 3A, measure the inlet pressure and outlet pressure of the particulate filter at step 300, and determine the difference between inlet and outlet pressures at step 301. Ask whether this pressure difference exceeds the threshold value for soot burnout at step 302. If the answer is No, return to step 300; if Yes, turn on the reformer at step 303.

At step 304, measure the inlet and outlet pressures and the inlet and outlet temperatures of the particulate filter and the oxygen concentration in the exhaust conduit. Determine the difference between inlet and outlet pressures at step 305, and ask whether this pressure difference exceeds the value to end burnout at step 306. If the answer at step 306 is No, turn off the reformer at step 307. If the answer at step 306 is Yes, ask at step 308 if the reformer timer on-cycle is less than 5 seconds.

If the answer at step 308 is Yes, increase the reformer timer on-cycle at step 309 (FIG. 3B).

At step 310, ask whether the hydrogen concentration of 5 vol. % in the exhaust conduit flow is greater than 5 vol. %. If the answer at step 310 is No, increase the reformate flow at step 311, and return to step 310. If the answer at step 310 is Yes, ask at step 312 whether the oxygen concentration in the exhaust conduit flow is 10 vol. % or greater.

If the answer at step 312 is No, increase the concentration of oxygen in the exhaust flow at step 313, and return to step 312. If the answer at step 312 is Yes, ask at step 314 (FIG. 3B) whether the exhaust temperature is greater than 700° C. If the answer at step 314 is No, ask at step 315 if the inlet temperature of the particulate filter is less than 650° C. If the answer at step 315 is No, go to step 317. If the answer at step 315 is Yes, increase the reformer flow at step 316, and return to step 314.

If the answer at step 314 is Yes, ask at step 317 whether the exhaust temperature is less than 750° C. If the answer at step 317 is No, decrease the reformer flow at step 318, and ask at step 319 if the outlet temperature of the particulate filter is greater than 700° C. If the answer at step 319 is No, go to step 321. If the answer at step 318 is Yes, decrease the oxygen level at step 320, and return to step 317.

If the answer at step 317 is Yes, ask at step 321 whether the inlet temperature of the particulate filter is greater than 600° C. If the answer at step 321 is No, ask at step 322 whether the outlet temperature of the particulate filter is less than 600° C. If the answer at step 322 is No, go to step 324. If the answer at step 322 is Yes, increase the reformer flow at step 323, and return to step 321.

If the answer at step 321 is Yes, ask at step 324 whether the inlet temperature of the particulate filter is less than 750° C. If the answer at step 324 is No, decrease the reformer flow at step 325, and ask at step 326 if the outlet temperature of the particulate filter is greater than 700° C. If the answer at step 326 is Yes, decrease the concentration of oxygen in the exhaust conduit flow at step 327, and return to step 324. If the answer at step 326 is No, go to step 324.

If the answer at step 324 is Yes, ask at step 328 if the outlet temperature of the particulate filter is greater than 600° C. If the answer at step 328 is No, ask at step 329 if the inlet temperature of the particulate filter is less than 750° C. If the answer at step 329 is Yes, increase the reformer flow at step 330, and return to step 328.

If the answer at step 328 is Yes, or if the answer at step 329 is No, ask at step 331 (FIG. 3C) whether the outlet temperature of the particulate filter is less than 700° C. If the answer at step 331 is No, decrease the reformer flow at step 332, decrease the concentration of oxygen in the exhaust flow at step 333, and return to step 331.

If the answer at step 331 is Yes, ask at step 334 whether the pressure difference between the inlet and outlet pressures of the particulate filter is decreased to the value selected to end burnout. If the answer at step 334 is Yes, return to steps 307 and 300 (FIG. 3A). If the answer at step 334 is No, return to step 304 (FIG. 3A).

If the answer at step 308 (FIG. 3A), is No, turn off the reformer at step 335 (FIG. 3C), set the reformer timer-off equal to zero at step 336, and increase the reformer timer off-cycle at step 337.

Following step 337, ask at step 338 if the inlet temperature of the particulate filter is less than 750° C. If the answer at step 338 is No, decrease the concentration of oxygen in the exhaust flow at step 339, and return to step 338.

If the answer at step 338 is Yes, ask at step 340 if the outlet temperature of the particulate filter is less than 700° C. If the answer at step 340 is No, decrease the concentration of oxygen in the exhaust flow at step 341, and return to step 340.

If the answer at step 340 is Yes, ask at step 342 if the reformer timer on-cycle is less than 5 seconds. If the answer at step 342 is Yes, return to step 337 (FIG. 3C). If the answer at step 342 is No, return to step 303 (FIG. 3A).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A motor vehicle exhaust aftertreatment system comprising:
    an exhaust conduit for conveying exhaust fluid from an engine, said conduit comprising a $NO_x$ adsorber that includes a $NO_x$ adsorber inlet and a $NO_x$ adsorber outlet and further comprising a particulate filter that includes a particulate filter inlet and a particulate filter outlet;
    a reformer for generating reformate containing hydrogen and carbon monoxide from fuel supplied from a fuel source;
    a reformate conduit for conveying said reformate from said reformer into said exhaust conduit upstream of said particulate filter;
    an oxygen sensor disposed in said exhaust conduit downstream of said reformate conduit and upstream of said particulate filter;
    a pressure sensor disposed at each of said particulate filter inlet and outlet for determining pressure drop through said particulate filter; and
    a temperature sensor disposed at each of said particulate filter inlet and outlet;
    wherein, in response to a pressure drop through said particulate filter attaining a threshold value, as determined by said pressure sensors disposed at said particulate filter inlet and outlet, reformate is introduced under selected controlled flow conditions from said reformer through said reformate conduit into said exhaust conduit and caused to undergo combustion, resulting in an exotherm, said selected controlled flow and subsequent combustion of said reformate in said exhaust conduit being carried out under conditions effective to maintain the temperature within said particulate filter within a selected temperature range, as measured by said temperature sensors respectively disposed at said inlet and outlet of said particulate filter; and
    wherein said exotherm resulting from said combustion of said reformate heats fluid passing through said particulate filter to a temperature effective to oxidize and thereby remove soot from said particulate filter, said oxygen sensor determining the oxygen concentration entering said particulate filter of said heated fluid in said exhaust conduit, said oxygen concentration being maintained within a selected concentration range, introduction of reformate into said exhaust conduit being discontinued when the pressure drop through said particulate filter is decreased to a selected value.

2. The motor vehicle exhaust aftertreatment system of claim 1 wherein said $NO_x$ adsorber comprises a catalyst, and said reformate in said exhaust conduit is caused to undergo combustion by interaction with said catalyst.

3. The motor vehicle exhaust aftertreatment system of claim 1 wherein said $NO_x$ adsorber is disposed upstream of said particulate filter in said exhaust conduit.

4. The motor vehicle exhaust aftertreatment system of claim 1 wherein said $NO_x$ adsorber is disposed downstream of said particulate filter in said exhaust conduit.

5. The motor vehicle exhaust aftertreatment system of claim 1 wherein said oxygen sensor determines the total oxygen concentration entering said particulate filter of said heated fluid in said exhaust conduit.

6. The motor vehicle exhaust aftertreatment system of claim 1 further comprising a burner disposed between said exhaust conduit and said reformate conduit, and said reformate in said exhaust conduit is caused to undergo combustion by heating in said burner.

7. The motor vehicle exhaust aftertreatment system of claim 6 wherein said burner comprises a glow plug.

8. A process for removing soot from a vehicle exhaust aftertreatment system that includes an exhaust conduit for conveying exhaust fluid from an engine, a reformer for generating reformate containing hydrogen and carbon monoxide from fuel supplied from a fuel source, a reformate conduit for conveying reformate from the reformer into the exhaust conduit, and an oxygen sensor disposed in the exhaust conduit for determining the oxygen concentration of fluid in the exhaust conduit, said process comprising:

measuring a pressure drop through a particulate filter included in said exhaust conduit, said particulate filter comprising an inlet and an outlet, each said particulate filter inlet and outlet comprising a pressure sensor and a temperature sensor;

in response to said measured pressure drop through said particulate filter attaining a threshold value, as determined by said pressure sensors disposed at said particulate filter inlet and outlet, introducing reformate under selected controlled flow conditions into said exhaust conduit upstream of said particulate filter;

causing said reformate in said exhaust conduit to undergo combustion in the presence of oxygen in said exhaust conduit, resulting in an exotherm and thereby heating fluid in said exhaust conduit;

measuring the oxygen concentration entering said particulate filter of said heated fluid in said exhaust conduit using said oxygen sensor;

maintaining the oxygen concentration of said heated fluid in said exhaust conduit within a selected concentration range;

passing heated fluid in said exhaust conduit through said particulate filter at a temperature effective to oxidize and thereby remove soot from said particulate filter, said temperatures being maintained within a selected temperature range, as measured by said temperature sensors respectively disposed at said inlet and outlet of said particulate filter; and discontinuing introduction of reformate into said exhaust conduit when said pressure drop through said particulate filter is decreased to a selected value.

9. The process of claim 8 wherein said selected concentration range of said oxygen in said exhaust conduit is greater than about 10 vol. %.

10. The process of claim 8 wherein said selected temperature range within said particulate filter is about 600° C. to about 750° C.

11. The process of claim 8 wherein said reformate is introduced into said exhaust conduit under selected controlled flow conditions comprising intermittent pulsed flow.

12. The process of claim 8 wherein said oxygen sensor measures the total oxygen concentration entering said particulate filter of said heated fluid in said exhaust conduit.

13. The process of claim 8 further comprising a $NO_x$ adsorber disposed in said exhaust conduit, said $NO_x$ adsorber comprising a catalyst.

14. The process of claim 13 wherein said $NO_x$ adsorber is disposed in said exhaust conduit upstream of said particulate filter.

15. The process of claim 13 further comprising:
interacting said reformate in said exhaust conduit with said catalyst, thereby causing combustion of said reformate and generation of said exotherm.

16. The process of claim 8 further comprising a burner disposed between said exhaust conduit and said reformate conduit.

17. The process of claim 16 further comprising:
contacting said reformate in said exhaust conduit with said burner, thereby causing combustion of said reformate and generation of said exotherm.

18. The process of claim 17 wherein said selected concentration range of said oxygen in said exhaust conduit is 11 vol. % to about 19 vol. %.

* * * * *